United States Patent [19]
Seth

[11] Patent Number: 6,129,964
[45] Date of Patent: *Oct. 10, 2000

[54] NONWOVEN PRESSURE SENSITIVE ADHESIVE TAPE

[75] Inventor: Jayshree Seth, Woodbury, Minn.

[73] Assignee: 3M Innovative Properties Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,250

[22] Filed: Nov. 6, 1997

[51] Int. Cl.[7] ............................................ B32B 3/00
[52] U.S. Cl. ..................... 428/40.1; 24/306; 24/448; 24/451; 428/41.5; 428/42.1; 428/95; 428/96; 428/97; 428/354; 428/355
[58] Field of Search ................... 428/40.1, 41.5, 428/42.1, 95, 96, 97, 355, 354, 356; 24/448, 306, 451

[56] References Cited

U.S. PATENT DOCUMENTS

| | | | |
|---|---|---|---|
| 2,532,011 | 11/1950 | Cahlquist et al. | 154/53.5 |
| 4,313,988 | 2/1982 | Koshar et al. | 428/40 |
| 4,482,687 | 11/1984 | Noshay et al. | 526/125 |
| 5,256,231 | 10/1993 | Gorman et al. | 156/178 |
| 5,290,615 | 3/1994 | Tushaus et al. | 428/40 |
| 5,605,729 | 2/1997 | Mody et al. | 428/37 |

FOREIGN PATENT DOCUMENTS

| | | |
|---|---|---|
| 0 250 248 A1 | 6/1987 | European Pat. Off. . |
| 0 389 212 A1 | 3/1990 | European Pat. Off. . |
| 0 668 336 A1 | 1/1994 | European Pat. Off. . |
| 2398603 | 7/1978 | France . |
| 08020751 | 1/1996 | Japan . |
| WO 92/15626 | 9/1992 | WIPO . |

*Primary Examiner*—Nasser Ahmad
*Attorney, Agent, or Firm*—Gary L. Griswold; Robert W. Sprague; William J. Bond

[57] ABSTRACT

A storage/dispensing assembly, e.g., a roll or stack, of non-woven pressure sensitive adhesive tape comprising one or more multilayer sheets of pressure sensitive adhesive tape arranged such that the adhesive layer in the assembly of an overlying non-woven pressure sensitive adhesive tape is in direct contact with the underlying nonwoven backing layer of non-woven pressure sensitive adhesive tape. The non-woven backing layer is formed at least in part of fibers having a denier of greater than 15 so as to decrease the level of fibers disengagement when an overlying nonwoven pressure sensitive adhesive tape is removed from the assembly.

31 Claims, 1 Drawing Sheet

NONWOVEN PRESSURE SENSITIVE ADHESIVE TAPE

BACKGROUND AND FIELD OF THE INVENTION

The present invention relates to a non-woven fibrous pressure sensitive adhesive tape specifically coated on one face with a pressure-sensitive adhesive and arranged over a like adhesive coated pressure sensitive adhesive tape without an intervening release element.

U.S. Pat. No. 5,605,729 describes a storage/dispensing assembly of a loop fastening material used in a hook and loop fastening system which comprises one or more multiple layered sheets of loop tape fastening material with a pressure-sensitive adhesive layer on one face of the loop tape fastening material. The loop tape fastening material is stored in a dispensable condition on an underlying loop tape fastening material such as to be in direct contact with the loop layer of the underlying loop tape fastening material. When the overlying loop tape fastening material is separated from the underlying loop tape fastening material, the loops of the underlying loop tape fastening material are presented in an engageable state. The loop tape fastening material generally comprises a loop layer comprising a multiplicity of flexible loops and an underlying base layer in which the loops are anchored and a pressure-sensitive adhesive layer on an opposite surface of the base layer. A wide variety of loop materials are described as suitable including knitted materials, woven materials, stitch bonded materials or non-woven materials. Exemplified is a roll of texturized polyester knitted loop fabric extrusion coated with polypropylene and subsequently coated with a pressure-sensitive adhesive of a tackified styrene-butadiene block copolymer. Also exemplified is a spun bond polypropylene loop fabric thermally bonded to a cast film of a ethylene- propylene impact copolymer resin, which film is adhesive coated on the opposite face with a tackified "KRATON" 1111 adhesive (a styrene-isoprene-styrene block copolymer based adhesive). This loop tape construction has been found to be quite advantageous in terms of its manufacturability; roll stability, ease of use, and performance. However, with non-woven fibrous loop tape materials, there is a tendency for the fibers of an underlying loop tape material to become disengaged with the backing material or base layer when the overlying loop tape fastening material is removed. This fiber disengagement can decrease the level of adhesion of the overlying loop tape pressure-sensitive adhesive layer when subsequently attached to a substrate and/or decrease the loop to hook adhesion with the underlying loop tape material. Generally, it is desirable to minimize this level of fiber disengagement.

It is also known to form a pressure-sensitive adhesive tape from a nonwoven or woven fibrous web. With nonwoven tape backings, generally the nonwoven fibers must be provided with sufficient anchorage so that they do not get pulled free when the tape is dispensed in a roll form without a release liner separating the individual wraps of the tape roll. The fibers are anchored with binders, bonding fibers, calendering, overcoats, or combinations thereof. These treatments, however, generally adversely effect the conformability, loft or solidity, and tactile feel of the backings. Generally, it is desired to provide a nonwoven tape backing that can be wound into a roll without the need for high levels of interfiber bonding or overcoat layers.

BRIEF DESCRIPTION OF THE INVENTION

A nonwoven pressure sensitive adhesive tape assembly is provided comprising one or more multilayer sheets of non-woven pressure sensitive adhesive tape comprising in order: (1) a non-woven backing layer forming its first major surface, and (2) a pressure-sensitive adhesive layer forming its second major surface.

The non-woven backing layer is formed at least in part of fibers or filaments having a denier of at least 15, which fibers generally do not have added binders or bonding fibers. The non-woven pressure sensitive adhesive tape is arranged in said assembly such that the adhesive layer of an overlying non-woven pressure sensitive adhesive tape is in direct contact with the nonwoven backing layer of an underlying non-woven pressure sensitive adhesive tape.

BRIEF DESCRIPTION OF THE DRAWING

The invention will be further explained with reference to the drawings, wherein.

These figures, which are idealized, are not to scale and are intended to be merely illustrative and non-limiting.

DETAILED DESCRIPTION OF THE PREFERRED EMBODIMENTS

Figure 1:
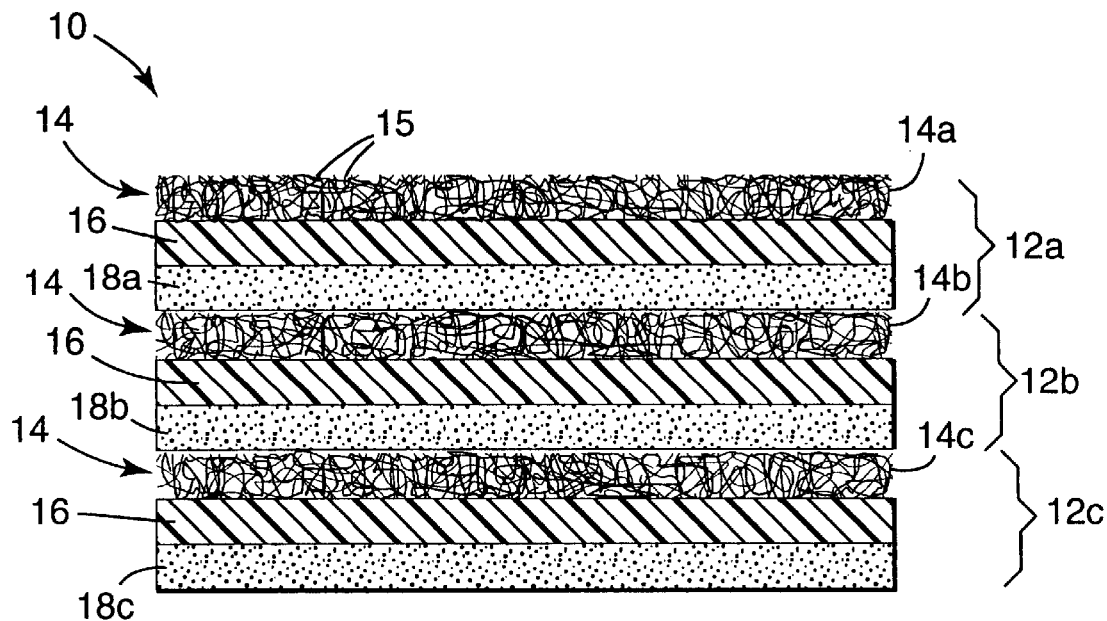
FIG. 1 is a cross-section of a portion of one embodiment of a storage/dispensing assembly of the invention.

An illustrative non-woven pressure sensitive adhesive tape assembly of the invention is shown in FIG. 1. Assembly 10 depicted comprises a stack of three multilayer sheets 12a, 12b, 12c of non-woven pressure sensitive adhesive tape. However, the assemblies of the invention can have an indefinite number of layers depending on the width of the non-woven pressure sensitive adhesive tape and the form of the stack or endless roll. The pressure sensitive adhesive tape 12 comprises in order: (1) non-woven backing layer 14 forming its first major surface, which non-woven backing layer 14, and (2) pressure-sensitive adhesive layer 18 forming the second major surface of the pressure sensitive adhesive tape 12. The non-woven pressure sensitive adhesive tape is arranged in the assembly 10, such that adhesive layer 18a of overlying non-woven pressure sensitive adhesive tape is in direct contact with the backing layer 14b of an underlying non-woven pressure sensitive adhesive tape.

Non-woven pressure sensitive adhesive tape used in assemblies of the invention may be made with a variety of non-woven materials such as spunbond non-wovens, melt blown non-wovens, carded webs, airlaid non-wovens, needlepunched non-wovens, spunlace non-wovens, suitable combinations of the above and the like.

For many applications, non-woven pressure sensitive adhesive tape used in assemblies of the invention will have a total basis weight between about 1 and 20 ounces/yard$^2$ (34–678 grams/meter$^2$), be made of filaments made of polyolefins, (e.g., polypropylene) polyesters, nylons or combinations of such materials.

In accordance with the invention, it has been found that when a given percentage of the non-woven backing material is formed from filaments or fibers having an average denier of at least 15 that significantly less fibers are removed from the backing when the overlying non-woven pressure sensitive adhesive tape is removed from the assembly. Generally, however, the fibers require anchorage which is generally accomplished by use of a backing layer between the nonwoven backing layer and the adhesive layer where the fibers of the nonwoven backing layer are bonded to, or embedded within, the backing layer. Preferably, this backing layer is a continuous film so as to also prevent adhesive migration from the adhesive layer into and through the nonwoven backing layer. This results in less contamination of the overlying non-woven pressure sensitive adhesive tape adhesive and corresponding better adhesion to substrates to which this loop tape fastening material is subsequently applied. Generally, the nonwoven backing material should have at least 25 percent by weight (preferably 50 to 100 percent by weight) of fibers from 15 to 50 denier, preferably 15 to 30 denier with the remainder comprising fibers less than 15 denier, preferably from 3 to 9 denier.

As discussed below, it may be desirable to specifically control the adhesion between the nonwoven backing layer 14 and adhesive layer 18 to achieve desired release properties of the overlying pressure sensitive adhesive tape in the assembly. Control of adhesive and release properties of the non-woven pressure sensitive adhesive tape in the assembly can be accomplished by a variety of techniques. First, adhesive 18 may be chosen for specific adhesion characteristics to a selected nonwoven backing layer 14. Second, backing layer 14 may be specially chosen for specific interaction with the selected adhesive. The material of nonwoven backing layer 14 may inherently exhibit desired release characteristics or the release properties of the backing layer may be modified, e.g., by incorporation of a release control agent (e.g., as an additive in a polymeric composition or via graft polymerization) into the fibrous material from which backing is made and/or application of a release control agent onto the surface of the non-woven backing, prior to arranging the non-woven pressure sensitive adhesive tape into the assembly. Illustrative examples of incorporated-type release control agents include polymer melt additives or graft polymerization such as the fluorochemical graft polymer disclosed in PCT Appln. No. WO 92/15626 (Rolando et al.), etc. Illustrative examples of surface applied (i.e., topical) release agents include urethanes such as disclosed in U.S. Pat. No. 2,532,011 (Dahlquist et al.), reactive silicones, fluorochemical polymers, epoxysilicones such as are disclosed in U.S. Pat. Nos. 4,313,988 (Bany et al.) and 4,482,687 (Kessel et al.), polyorganosiloxane-polyurea block copolymers such as are disclosed in European Appln. No. 250,248 (Leir et al.), etc.

The adhesion of the adhesive layer to the underlying non-woven backing layer is preferably low enough such that the non-woven backing layer fibers are not substantially pulled free from the non-woven backing layer when the adhesive layer is separated therefrom. This effect is substantially aided by the use of fibers or filaments having a denier of at least 15 in the above described concentration ranges in the non-woven backing layer. If a substantial number of the fibers do not remain anchored to the nonwoven backing layer and are pulled free, dislodged fibers may tend to contaminate the overlying adhesive layer and degrade its adhesion properties.

Figure 2:
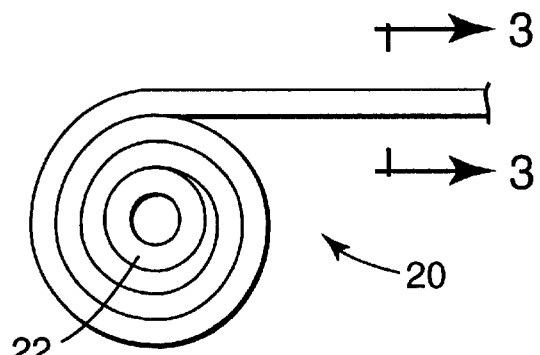
FIG. 2 is an edge view of another embodiment of a storage/dispensing assembly of the invention with a portion of dispensed pressure sensitive adhesive tape.
Figure 3:
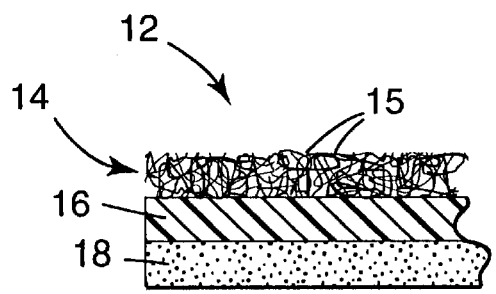
FIG. 3 is a cross-sectional of the dispensed pressure sensitive adhesive tape of FIG. 2.

FIG. 2 illustrates another embodiment of the invention wherein storage/dispensing assembly 20 is a roll comprising one or more multilayer sheets of pressure sensitive adhesive tape as described above wound convolutely upon itself around core 22. As shown, the pressure sensitive adhesive tape wound concentrically and generally aligned, however, the successive pressure sensitive adhesive tape courses can be wound in any suitable manner such as by levelwinding or the like.

The overlying adhesive layer typically exhibits a peel force to the underlying nonwoven backing layer of between about 4 and about 400 grams/centimeter-width, preferably between about 8 and 120 grams/centimeter-width, and most preferably between about 8 and about 80 grams/centimeter-width. As those skilled in the art will appreciate, embodiments of the invention may be made with peel forces outside these ranges if desired. Typically, however, the peel force should be less than the internal tear strength of the non-woven backing layer 14 or the pressure sensitive adhesive tape such that the pressure sensitive adhesive tape can be readily dispensed from the assembly in usable fashion. The pressure sensitive adhesive tape on a roll typically exhibits an unwind force of between about 4 and about 250 grams/centimeter-width, and preferably between about 8 and about 120 grams/centimeter-width.

Adhesive layer 18 of the pressure sensitive adhesive tape of the invention is a pressure-sensitive adhesive. Selection of a suitable adhesive will be based in part on such factors as the substrate to which the pressure sensitive adhesive tape is to be attached, the nature of the backing layer, the desired properties of the pressure sensitive adhesive tape 12, the conditions of use to which the pressure sensitive adhesive tape 12 will be exposed, and available converting techniques and equipment for removing pressure sensitive adhesive tape 12 from the storage/dispensing assembly and conversion, e.g., cutting or slitting, to desired format. The adhesive layer 18 should be tacky at room temperature, adhere as desired to intended substrates to which the pressure sensitive adhesive tape 12 is to be applied, adhere well to the backing 16 or the pressure sensitive adhesive tape base layer. Suitable adhesives for particular applications can be readily selected by those skilled in the art. Illustrative examples of suitable adhesives include: acrylates, tackified natural rubber, tackified synthetic rubber resins, etc. The adhesive layer might be substantially continuous or may be patterned if desired. Suitable adhesives can be readily selected by those skilled in the art.

The pressure sensitive adhesive is preferably a tackified elastomer where the elastomer is an A-B type block copolymer wherein the A block and B blocks are configured in linear, radial or star configurations. The A block is formed of a mono-alkenylarene, preferably a polystyrene block having a molecular weight between 4000 and 50,000, preferably between 7000 and 30,000. The A block content is preferably about 10 to 50 weight percent, preferably about 10 to 30 weight percent of the block copolymer. Other suitable A blocks may be formed from alpha-methylstyrene, t-butylstyrene and other ring alkylated styrenes, as well as mixtures thereof. The B block is formed of an elastomeric conjugated diene, generally polyisoprene having an average molecular weight from about 5000 to about 500,000, preferably from about 50,000 to about 200,000. The B block content is generally 90 to 500 percent, preferably 90 to 70 percent by weight. The tackifiying components for the elastomer based adhesives generally comprise solid tackifying resin and/or a liquid tackifier or plasticizer. Preferably, the tackifying resins are selected from the group of resins at least partially compatible with the polydiene B block portion of the elastomer. Although not preferred, generally a relatively minor amount of the tackifying resin can include resins compatible with the A block, which when present are generally termed end block reinforcing resins.

Generally, end block resins are formed from aromatic monomer species. Suitable liquid tackifiers or plasticizers or use in the fastening tape tab adhesive composition include napthenic oils, paraffin oils, aromatic oils, mineral oils or low molecular weight rosin esters, polyterpenes and C-5 resins. Solid tackifying resins include C-5 resins, resin esters, polyterpenes and the like.

The tackified portion of the pressure sensitive adhesive generally comprises from 20 to 300 parts per 100 parts of the elastomeric phase. Preferably, this is predominately solid tackifier, however, from 0 to 25 weight percent, preferably 0 to 10 weight percent of the adhesive can be liquid tackifier and/or plasticizer.

Generally, an additional layer needs to be provided between the non-woven backing layer and the adhesive layer. FIG. 1 shows further backing layer 16.

Additional backing layers 16 could be placed between the nonwoven backing layer and the adhesive layer and could be further nonwoven layers, film layers, paper, woven layers, or the like. In a particular preferred embodiment, the pressure sensitive adhesive tape nonwoven backing layer has an extrusion bonded film as an additional layer, such as disclosed in U.S. Pat. No. 5,256,231. In this case, the nonwoven backing layer material would be fed into a nip formed between two nested surfaces, such as two co-rotating intermeshing rolls. Into the nip is fed the non-woven backing layer material and a thermoplastic backing layer in a molten state from a die, with an optional further backing, or other layer on the opposite face of the molten thermoplastic backing layer. The pressure applied by the nip causes the fibers of the non-woven backing layer to be impregnated into the thermoplastic backing.

Sometimes, additional backing layers 16 are used to impart or define in large part the desired tensile strength of the non-woven pressure sensitive adhesive tape 12. In most embodiments, any additional backing layers would have a thickness between about 5 and about 12,500 microns with the larger thicknesses typically being foam type backings. When the backing is, for example, a polyolefin sheet, thicknesses between about 25 and about 500 microns, sometimes between about 50 and 250 microns, will be common.

It will be understood that backings of thicknesses outside these ranges may be desired in some instances.

Test Methods

Fiber Delamination Test: 180 Degree Peel Adhesion and 90 Degree Peel Readhesion

The fiber delamination test was used to examine fiber disengagement and the subsequent contamination of the pressure-sensitive adhesive of the nonwoven fastening tape.

A 2 inch×5 inch (5.08 cm×12.7 cm) piece of the nonwoven fastening tape to be tested was securely placed adhesive side down onto a 2 inch×5 inch (5.08×12.7 cm) steel panel. A 1 inch (2.54 cm) wide strip of pressure-sensitive adhesive test tape with a paper leader attached was then centrally placed on the nonwoven material so that the leading edge of the adhesive test tape was along the length of the panel. The test tape adhesive was a tackified styrene-isoprene type block copolymer pressure-sensitive adhesive (XMF-4065 available form 3M Company). The sample was rolled by hand, once in each direction, using an 11 pound (5.3 kilogram) roller. The sample panel was then placed into the bottom jaw of an Instron™ constant rate of extension tensile tester. Without pre-peeling the sample, the end of the paper leader was placed in the upper jaw of the tensile tester so that there was no slack in the leader. At a crosshead speed of 12 inch (30.5 cm) per minute, a chart recorder was used to record the peel which was maintained at 180 degrees. The load required to remove the test tape from the nonwoven surface of the fastening tape was recorded. The results reported in the Table are in grams/2.54 cm-width. The values represent an average of at least two independent measurements.

To examine the extent that the pressure-sensitive adhesive had been detackified due to fibers transferring from the nonwoven material, the contaminated tape (the tape which had been adhered to the nonwoven material) was tested for 90 degree peel readhesion from a smooth polyethylene film surface. The 90 degree peel readhesion test is described below.

90 Degree Peel Readhesion:

A 13 mil (330 micron) piece of smooth polyethylene film was securely adhered to a steel panel measuring two inches× five inches (5.1 cm×12.7 cm) using double-coated adhesive tape. The contaminated adhesive test tape was centrally placed adhesive side down on the surface of the polyethylene film and the tape was rolled down with two passes of a 100 gram rubber roller. The panel was placed into a fixture that was then placed into the bottom jaw of an Instron constant rate tensile tester while the release tape was held by the upper jaw. The upper jaw was set in motion at a constant crosshead speed of 12 inches (30.5 cm) per minute while the steel panel was moved so as to keep the release tape at a 90 degree angle to the panel. The tests were carried out at a constant temperature of 21° C. and 50 percent relative humidity. The force required to remove the contaminated tape from the polyethylene film was recorded as the readhesion value. The readhesion data in the Table are reported in grams/2.5 cm-width. The results represent an average of at least two independent measurements.

EXAMPLES

Examples 1 and 2, and Comparative Example 3

Nonwoven fastening tapes were prepared by first extrusion coating a polypropylene resin (#7C50, a polyethylene-polypropylene impact copolymer available from Union Carbide) onto a pattern bonded carded nonwoven web to provide a thermoplastic backing layer. The basis weight of the thermoplastic backing layer for the examples was about 55–60 grams/meter$^2$. The carded nonwoven webs had a diamond bonding pattern with diamonds that were approximately 4 mm wide across the points of the diamonds having bonding portions approximately 1 mm wide. The fiber types and sizes that were used to prepare the carded nonwoven webs are summarized in the Table. The basis weights of the carded nonwoven webs for the examples were about 45–48 grams/meter$^2$.

The carded nonwoven web side of the material was corona treated to have a surface energy of about 33 dynes/cm and it was then coated with a release material. The release material used was a polyorganosiloxane-polyurea copolymer type release material similar to those described in U.S. Pat. No. 5,290,615. The coating thickness of the release material was approximately 0.4–0.8 grams/meter$^2$. A pressure-sensitive adhesive was then hot melt coated onto the thermoplastic backing layer. The adhesive used was the same tackified styrene-isoprene type block copolymer pressure-sensitive adhesive that was used on the adhesive test tape in the fiber delamination test described above. The adhesive coating thickness was approximately 38 microns. The nonwoven fastening tape was then wound upon itself into roll form without a release liner.

The examples were tested for Fiber Delamination according to the test method described above. The results are summarized in the Table.

TABLE

| Examples | Fiber Type & Size | 180 Degree Peel Adhesion | 90 Degree Peel Re-adhesion to polyethylene |
|---|---|---|---|
| 1 | 18 denier J32[1] | 109 | 770 |
| 2 | 15 denier T-182[2] | 202 | 722 |
| C3 | 9 denier T-196[2] | 1510 | 33 |

[1] J32 are polypropylene staple fibers having a fiber length of 1 7/8 inch (4.76 cm) and are available from Amoco.
[2] T-196 and T-182 are polypropylene staple fibers having a fiber length of 1 7/8 inch (4.76 cm) and are available from Hercules Inc.

Considerably higher 180 peel adhesion values were obtained for the example (C3) that was prepared with the lower denier fibers as compared to those that were prepared with the higher denier fibers (Examples 1–2). This suggests that the pressure-sensitive adhesive adheres so strongly to the lower denier fibers that fiber contamination of the adhesive layer on the overlying nonwoven fastening tape material occurs when it is removed from the underlying nonwoven fastening tape material. This results in fiber contamination of the overlying nonwoven tape adhesive and a corresponding decrease in the adhesion of the nonwoven fastening tape to substrates. This was affirmed by the readhesion data as the 90 degree peel readhesion value was markedly lower (essentially nonfunctional) for the example that was prepared with the lower denier fibers.

What is claimed is:

1. A non-woven pressure sensitive adhesive tape assembly comprising one or more multilayer sheets of non-woven pressure sensitive adhesive tape comprising in order: (1) a backing having a non-woven backing layer forming its first major surface of the pressure sensitive adhesive tape, and (2) a pressure-sensitive adhesive layer forming the second major surface of the pressure sensitive adhesive tape;

wherein the non-woven backing layer is formed at least in part of fibers wherein these individual fibers have a denier of from 15 to 30, and said non-woven pressure sensitive adhesive tape is arranged in said assembly such that the adhesive layer of an overlying non-woven pressure sensitive adhesive tape is in direct contact with the non-woven backing layer of an underlying non-woven pressure sensitive adhesive tape.

2. The assembly of claim 1 further wherein said adhesive layer of the overlying non-woven pressure sensitive adhesive tape pressure sensitive adhesive tape pressure sensitive adhesive tape exhibits a peel force to said underlying nonwoven backing layer of between about 4 and about 250 grams/centimeter-width.

3. The assembly of claim 1 further wherein said adhesive layer of the overlying non-woven pressure sensitive adhesive tape exhibits a peel force to said underlying nonwoven backing layer of between about 8 and 120 grams/centimeter-width.

4. The assembly of claim 1 further wherein said adhesive layer of the overlying non-woven pressure sensitive adhesive tape exhibits a peel force to said underlying nonwoven backing layer of between about 8 and about 80 grams/centimeter-width.

5. The assembly of claim 1 wherein said assembly is a stack comprising two or more said sheets of non-woven pressure sensitive adhesive tape.

6. The assembly of claim 1 wherein said assembly is a roll comprising one or more said sheets of non-woven pressure sensitive adhesive tape wound upon itself.

7. The roll of claim 6 wherein said sheet of non-woven pressure sensitive adhesive tape on the roll exhibits an unwind force of between about 4 and about 250 grams/centimeter-width.

8. The roll of claim 6 wherein said sheet of non-woven pressure sensitive adhesive tape on the roll exhibits an unwind force of between about 8 and about 120 grams/centimeter-width.

9. The roll of claim 6 wherein said non-woven pressure sensitive adhesive tape has a sheet width of at least one centimeter and is wound concentrically on the roll.

10. The roll of claim 6 wherein said roll has a roll radius of up to 50 centimeters.

11. The assembly of claim 1 wherein said sheet comprises a release control agent incorporated into said non-woven backing layer prior to arranging said non-woven pressure sensitive adhesive tape into said assembly.

12. The assembly of claim 1 wherein said sheet comprises a release control agent applied to the surface of said non-woven backing layer prior to arranging said non-woven pressure sensitive adhesive tape into said assembly.

13. The assembly of claim 1 wherein said backing comprises a further backing layer bonded between said non-woven backing layer and said adhesive layer.

14. The assembly of claim 13 wherein said further backing layer is continuous.

15. The assembly of claim 13 wherein said further backing layer comprises a film layer.

16. The assembly of claim 1 wherein said backing is a multilayer backing.

17. The assembly of claim 13 wherein said further backing layer comprises a foamed material.

18. The assembly of claim 13 wherein said further backing layer has a thickness between about 5 and about 12,500 microns.

19. The assembly of claim 13 wherein said further backing layer has a thickness between about 25 and about 500 microns.

20. The assembly of claim 13 wherein said further backing layer has a thickness between about 50 and about 250 microns.

21. The assembly of claim 1 wherein said non-woven backing layer is comprised of;
    a) from 25 to 100 weight percent of fibers having a denier of from 15 to 50;
    b) from 0 to 75 weight percent of fibers having a denier of less than 25.

22. The assembly of claim 1 wherein said non-woven backing layer is comprised of;
    a) from 50 to 100 weight percent of fibers having a denier of from 15 to 30;
    b) from 0 to 50 weight percent of fibers having a denier of less than 25.

23. The assembly of claim 13 wherein the non-woven backing layer comprises a non-woven web intermittently bonded to the further backing layer.

24. The assembly of claim 23 wherein the non-woven backing layer is bonded to the further backing layer by heat bonding, ultrasonic bonding, or extrusion bonding.

25. The assembly of claim 23 wherein the non-woven backing layer comprises a web formed of discontinuous fibers.

26. The assembly of claim 24 wherein the non-woven backing layer comprises carded web of staple fibers.

27. The assembly of claim 23 wherein the non-woven backing layer is extrusion bonded to a thermoplastic film layer forming the backing layer.

28. The assembly of claim 1 wherein the pressure sensitive adhesive layer comprises a tackified elastomer adhesive.

29. The assembly of claim 28 wherein the elastomer is a A-B type block copolymer where the A block is formed of a mono-alkenylarene and the B block is formed of a conjugated diene where the A block content is from 10 to 50 weight percent and the B block content is from 90 to 50 weight percent the tackifier comprising 20–300 parts by weight tackifier to 100 parts elastomer.

30. The assembly of claim 29 wherein the tackifier comprises a liquid resin, a solid resin, and/or a plasticizer at least in part compatible with the B block.

31. The assembly of claim 30 wherein the A block comprises 10–30 weight percent of the elastomer and the B block comprises 90–70 weight percent of the block copolymer and the tackifier is predominately a solid tackifying resin.

* * * * *

UNITED STATES PATENT AND TRADEMARK OFFICE
CERTIFICATE OF CORRECTION

PATENT NO. : 6,129,964
DATED : October 10, 2000
INVENTOR(S) : Seth, Jayshree

It is certified that error appears in the above-identified patent and that said Letters Patent is hereby corrected as shown below:

Column 1,
Line 34, delete "of a" and insert in place thereof -- of an --.

Column 4,
Line 62, delete "or" following "plasticizers" and insert in place thereof -- for --.

Column 5,
Line 54, delete "form" and insert in place thereof -- from --.

Column 6,
Line 16, delete "Instron" and insert in place thereof -- Instron$^{TM}$ --.

Column 7,
Line 46-47, delete "pressure sensitive adhesive tape pressure sensitive adhesive tape".

Column 9,
Line 3, delete "a" and insert in place thereof -- an --.

Signed and Sealed this

Nineteenth Day of November, 2002

Attest:

JAMES E. ROGAN
*Attesting Officer*        *Director of the United States Patent and Trademark Office*